June 23, 1953     H. L. POTTER     2,643,165
BALL BEARING
Filed Jan. 24, 1949
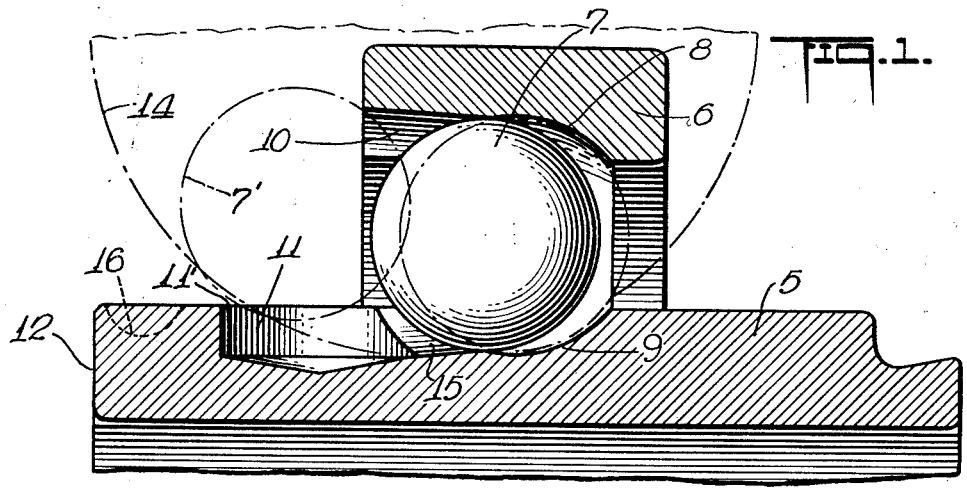
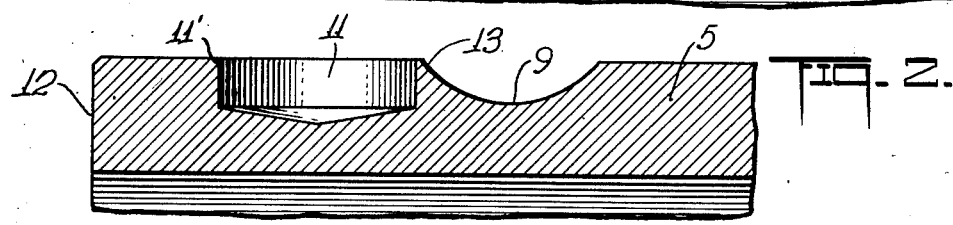
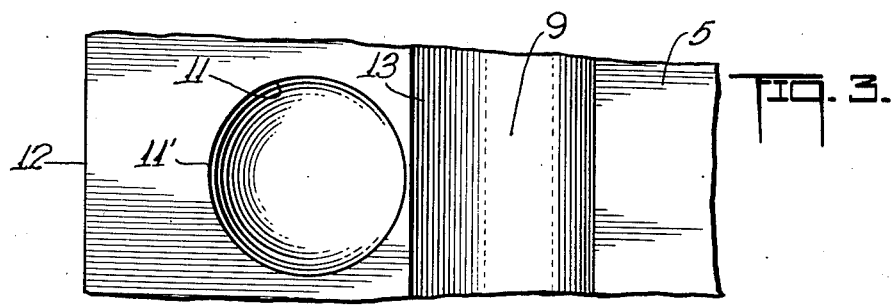
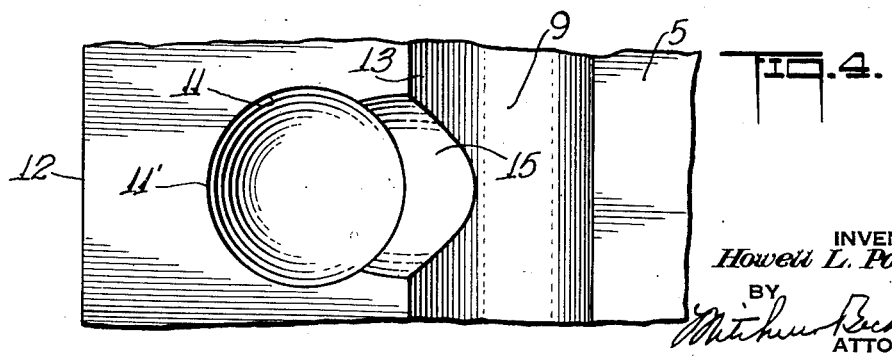
INVENTOR
*Howell L. Potter*
BY
*Mitchell Bechert*
ATTORNEYS Patented June 23, 1953

2,643,165

UNITED STATES PATENT OFFICE 2,643,165

BALL BEARING

Howell L. Potter, New Britain, Conn., assignor to The Fafnir Bearing Company, New Britain, Conn., a corporation of Connecticut Application January 24, 1949, Serial No. 72,346

4 Claims. (Cl. 308—198)

My invention relates to antifriction bearings, and in particular to race-ring constructions therefor.

In antifriction bearings in which the race grooves are defined by opposed radially extending walls, it is customary to provide filler slots in one or both of the race rings in order to permit assembly of the antifriction elements between the race rings. In the case of inner rings for such bearings, two methods and constructions for such slots have generally been used. In accordance with one construction, the slot is milled from the race groove and generally longitudinally out to one end of the bearing, but such construction provides a discontinuous outer surface on the inner ring so as to render infeasible the relatively inexpensive grinding of the ring on a centerless grinder; this construction also renders infeasible the application of a seal to run on the slotted side of the bearing ring. In accordance with the other construction, the outer surface of one end of the inner ring is turned down to a diameter slightly less than the diameter of the bottom of the race groove, and this turned down end extends from the edge of the race groove to the end of the ring. An axial filler slot is then cut in the barrier between this turned down end and the race groove. Even though this second method of construction may permit the application of a seal between the bearing rings, the outer turnd down end of the inner ring is rendered unnecessarily weak and the turned down end is usually rough and unsatisfactory for receiving a contact seal.

It is, accordingly, an object of the invention to provide an improved bearing-ring construction and method of construction.

It is another object to provide an inner-bearing-ring construction wherein a filler slot may be provided for insertion of antifriction elements, said slot involving the removal of a minimum of material.

It is a further object to provide an inner-bearing-ring insertion-slot construction which may permit the application of seal means to the bearing and which may not weaken the inner ring.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a fragmentary sectional view through an antifriction bearing incorporating features of the invention, the parts being shown during an assembly operation;

Fig. 2 is a fragmentary sectional view of the inner ring of Fig. 1, during the process of making said inner ring;

Fig. 3 is a more or less plan view of the part of the inner ring which is shown in Fig. 2; and Fig. 4 is a view similar to Fig. 3, after a further step in the manufacture of the inner ring of Fig. 1.

Briefly stated, my invention contemplates an improved filler-slot construction and method of construction for a race ring of an antifriction bearing. The slot may be formed by providing a limited recess in the outer surface of the inner ring, said recess being located between the race groove and one end of the ring, and the ring may be cut away between the recess and the groove. In the arrangement to be described, the recess is provided by making a shallow generally radial bore in the outer surface of the ring and adjacent one side of the race groove. The ring material between the bore and the groove may then be cut away, as by a grinding operation, after hardening and after the race groove has been ground to the desired finish.

Referring to the drawings, my invention is shown in application to an antifriction bearing including an inner ring 5, an outer ring 6, and ball-type antifriction elements 7. The antifriction elements 7 may ride in an outer race groove 8 and in an inner race groove 9 having lateral walls extending generally radially. Ball-insertion or filler slots, such as the slot 10 in the outer ring 6, may be ground or otherwise formed at one location on each ring.

In accordance with the invention, I provide a novel insertion or filler slot means for the inner ring 5 so as not to impair the strength of the inner ring and so as also to permit the application of seal means between the race rings 5—6 on the insertion side of the bearing. Such insertion slot may include a limited recess 11 between the race groove 9 and one end 12 of the ring 5. This recess 11 may be simply formed as a shallow bore extending generally radially and preferably near one lip or wall 13 of the race groove 9. The bore 11 may be made by a drill sharpened slightly flatter at the point than is conventional, and the drill may be run to a depth substantially the same as and preferably slightly below the race groove depth. This drilling operation may be effected before the ring 5 is subjected to hardening and, therefore, before the race groove 9 is finish-ground; and, since the ring material between the bore 11 and the race groove 9 is to be cut away after hardening, I prefer that the amount of material then removed shall be a minimum. The bore 11 is thus preferably drilled as close as is tolerable to the wall 13 of the groove 9. The bore 11 may also be of such diameter or so longitudinally located that the outer end or lip 11' thereof may provide adequate clearance for the insertion of a ball, as indicated by the dot-dash outline 7' of a ball 7 in the process of insertion.

As has been implied above, the insertion slot of the inner ring 5 may be completed by a grinding step to take place after hardening and after the race groove 9 has been finish-ground. I have found that this final removal of slot material may be very effectively accomplished by a grinding wheel of relatively large radius, as indicated by the dot-dash outline 14 of Fig. 1. The wheel 14 may be spun on an axis generally tangential to the outer surface of the inner ring 5, and there need be no chucking of the inner ring to accomplish this final grinding step. In practice, the inner ring is placed face down on a table and brought up against the grinding wheel 14, which is spun on a horizontal axis. Once this axis has been properly adjusted for spacing above the table, the slot cut is properly located; and, as grinding proceeds, the operator need merely oscillate the inner ring from side to side about the face of the wheel in order to generate the desired shape. Of course, the insertion slot may be made to enter upon the race groove 9 at any desired location by adjustment of the placement of the grinding wheel axis, but, in the preferred form shown, the recess or groove 15 cut away by the grinding wheel 14 terminates short of the point of maximum depth of the groove 9.

It will be clear that I have described an improved insertion or filler-slot construction and an improved method of construction for antifriction bearings. Since the slot does not run out to the face or end of the ring, there is an uninterrupted cylindrical surface on which a seal may be run; this could be a regular felt seal, a pressed or slinger-type seal, or the outer surface of the ring 5 could be grooved (as schematically indicated by dotted lines 16 in Fig. 1) for the accommodation of a resilient seal of the type described in the copending application of F. Leister et al., Serial No. 790,604, filed December 9, 1947, now abandoned. Because of the above-mentioned uninterrupted cylindrical surface at the end 12, it is possible to grind the outer surface of the ring 5 on a centerless grinder after making the bore 11 and after hardening; by using a centerless grinder it will be appreciated that the cost may be reduced essentially to one-fifth the present cost, since the present method requires mounting the inner ring on an arbor in a cylindrical grinder. Aside from the above-noted features of better adaptability to seals and of cheaper grinding, my improved construction makes possible considerable savings in machining, for the bore 11 can be drilled more quickly than the conventional slot can be milled, and the drill can be easily resharpened so as to last for an indefinite time, whereas mills wear out relatively rapidly and are expensive and difficult to sharpen.

While I have described my invention in detail for the preferred method and form shown, it will be understood that modifications may be made within the scope of the invention as defined in the appended claims.

I claim:

1. An inner race ring for an antifriction bearing, comprising a generally cylindrical ring having an arcuate circumferential groove therein for the reception of antifriction bearing members, said ring on its outer cylindrical surface having a generally radial hole therein located intermediate said circumferential groove and one end of said race ring, said race ring having a filler slot of generally arcuate section intersecting and joining said generally radial hole and the adjacent side of said circumferential groove and extending nearly to but terminating short of the bottom of said circumferential groove.

2. In the combination defined in claim 1, said generally radial hole being of generally cylindrical form.

3. In the combination defined in claim 1, said generally radial hole being of approximately the same depth as said circumferental groove.

4. In the combination defined in claim 1, said generally radial hole being of about the same diameter as a ball to be received in said circumferential groove.

HOWELL L. POTTER.

References Cited in the file of this patent

UNITED STATES PATENTS

| Number | Name | Date |
|---|---|---|
| 1,589,415 | Nides | June 22, 1926 |
| 1,854,897 | Ganster | Apr. 19, 1932 |
| 2,143,091 | Searles | Jan. 10, 1939 |
| 2,236,200 | Potter | Mar. 25, 1941 |
| 2,384,444 | Cravener | Sept. 11, 1945 |

FOREIGN PATENTS

| Number | Country | Date |
|---|---|---|
| 7,135 | Great Britain | 1910 |
| 346,274 | France | Jan. 10, 1905 |